(12) United States Patent  
Mc Clellan

(10) Patent No.: US 7,527,251 B2
(45) Date of Patent: May 5, 2009

(54) NON-HELICAL TORSION SPRING SYSTEM

(76) Inventor: W. Thomas Mc Clellan, 2680 Arbor Dr., Fort Lauderdale, FL (US) 33312

( * ) Notice: Subject to any disclaimer, the term of this patent is extended or adjusted under 35 U.S.C. 154(b) by 0 days.

(21) Appl. No.: 11/698,811

(22) Filed: Jan. 26, 2007

(65) Prior Publication Data

US 2008/0179799 A1 Jul. 31, 2008

(51) Int. Cl.
*F16F 1/14* (2006.01)
(52) U.S. Cl. .................. 267/154; 267/273; 267/277; 267/285
(58) Field of Classification Search ............. 267/273, 267/154, 285, 277, 283, 284; 280/5.5, 5.511, 280/124.106, 124.137, 124.166; 160/191; 49/386
See application file for complete search history.

(56) References Cited

U.S. PATENT DOCUMENTS

| 4,723,790 | A | * | 2/1988 | Wharton ............... 280/124.13 |
| RE32,878 | E | * | 2/1989 | Leonard .................... 16/298 |
| 4,884,790 | A | | 12/1989 | Castrilli |
| 4,961,743 | A | | 10/1990 | Kees, Jr. et al. |
| 4,966,386 | A | | 10/1990 | Werdich |
| 5,020,783 | A | | 6/1991 | Schröder et al. |
| 5,158,321 | A | | 10/1992 | Maul |
| 5,163,701 | A | | 11/1992 | Cromley, Jr. |
| 5,263,736 | A | * | 11/1993 | Stevens .................. 280/6.157 |
| 5,326,128 | A | | 7/1994 | Cromley, Jr. |
| 5,382,007 | A | | 1/1995 | Holzheimer |
| 5,464,197 | A | | 11/1995 | Ecclesfield |
| 5,556,083 | A | | 9/1996 | Furihata et al. |
| 5,611,524 | A | * | 3/1997 | Gordon ................... 267/154 |
| 5,716,042 | A | | 2/1998 | Derviller |
| 6,099,006 | A | | 8/2000 | Sugiyama et al. |
| 6,241,224 | B1 | | 6/2001 | Leibman |
| 6,431,531 | B1 | | 8/2002 | Yu et al. |
| 6,454,284 | B1 | | 9/2002 | Worman |
| 6,752,411 | B2 | | 6/2004 | Few |
| 6,877,728 | B2 | | 4/2005 | Gehret |
| 6,945,522 | B2 | | 9/2005 | Eshelman |

* cited by examiner

*Primary Examiner*—Robert A Siconolfi
*Assistant Examiner*—Vu Q Nguyen
(74) *Attorney, Agent, or Firm*—Laurence A. Greenberg; Werner H. Stemer; Ralph E. Locher

(57) ABSTRACT

A non-helical torsion spring system includes an arm to be connected to a load, such as a frame or chassis of a vehicle, and at least one ring to be connected to a moving member, such as a vehicle suspension member. Torsion elements, which may be disposed in concentric groups, each have one end disposed at and resisting rotation relative to the arm but permitting flexural movement relative to the arm. The torsion elements also each have another end disposed at and resisting rotation relative to the at least one ring but permitting flexural movement relative to the at least one ring. At least one of the ends is axially movable. Each group of torsion elements is connected to a respective ring. A torsion control adjusts torsion in the at least two torsion elements, manually or through the use of servomotors.

19 Claims, 15 Drawing Sheets

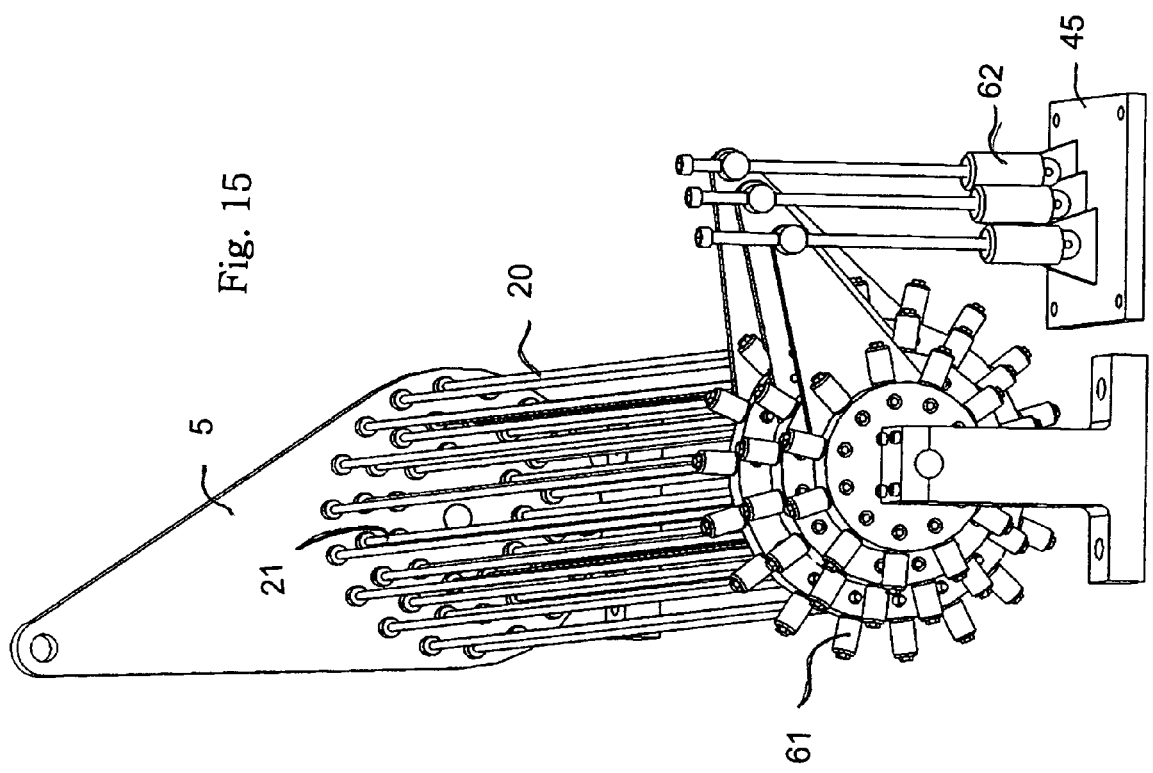

NON-HELICAL TORSION SPRING SYSTEM

BACKGROUND OF THE INVENTION

1. Field of the Invention

The invention relates to a non-helical torsion spring system. Such a system may be used between a frame or chassis of a vehicle and a vehicle suspension member.

2. Description of the Related Art

True torsion springs or rods (non-helical or coil) are objects which twist the material of an object around the longitudinal axis of that object and as such are limited by the rapid onset of internal stresses created within the element. Those stresses restrict spring loading, range of rotation, usable spring arc, cycle life and spring efficiency, while creating deformations within the torsion element, inducing element failure and preventing composite or non-metallic construction.

Helical or coiled springs, such as those disclosed in U.S. Pat. Nos. 5,464,197 and 4,961,743, or garage door springs, where only a configuration or "coil shape" of the object is referenced to rotate with respect to another "coil shape" of the object, but the material between is flexing in simple tension and compression, is not a true torsion device. True torsion is a specific movement of objects wherein adjacent materials within the object are twisted in opposing directions.

The first three stresses of the true torsion element are significant obstacles because they increase by the square of the radius of the element and prevent the construction of efficient, wide load range, controllable torsion spring systems.

The first internal stress occurs as the center material of the element twists in a straight path while the outer material (displaced from the centerline) rotates in a longer spiral path and stresses lengthwise relative to the center. Two equal and opposite end points of an object at zero rotation, become equal and opposite end points again after 360 degrees of rotation but the intervening material between the two points has undergone considerable lengthwise stress compared to the center material because of its longer spiral path.

The second internal stress is also longitudinal shear but at right angles to the first. If one visualizes the element as a stack of drinking straws or small columns, as the ends rotate in opposite directions or in torsion, the straws or columns in the outer layer shift lengthwise in relation to each other. Torsion in either direction creates a series of lengthwise stresses between each column, and area of material. Each lengthwise segment of each layer or material of equal distance from the center is placed in shear stress with the adjacent material in the same or equal distance from the center layer.

The third internal stress is torsion's attempt to rotate each group of molecules or areas in torsion around their own centers and places the areas or zones between adjacent material groups in rotational stress. Those edge zones of adjacent material attempt to rotate in the same direction, like rolling pencils on a surface reveal similar rotations of the material, but which also demonstrates that the surfaces between those columns shear in opposite directions.

Those stresses increase by the square of the radius so that a doubling of the radius increases the stresses by a factor of four. Stresses are unavoidable in torsion because each particle or portion of the torsion element is in an unequal orbital arc or unequal three-dimensional motions compared to all other particles or portions of the element.

The forth stress is the conflict between torsion and flexion at the intersection between the torsion material and its fixed attachment ends. The material at the end of a torsion element is secured rigidly, even by a simple 90-degree hook attachment. At that narrow transverse junction, the rigidly fixed material abruptly flexes with the spiral angle formed by the material in torsion. That reversing angle change creates a focus of destructive tension in a narrow zone directly across and completely through the torsion material. That coincides with the most common fatigue fracture or failure point in torsion rods.

Devices having a single torsion bar are disclosed, for example, in U.S. Pat. Nos. 6,099,006, 6,431,531, 5,716,042 and 6,945,522. Bars which are hollow, have non-round cross sections or include multiple concentric pipes are disclosed, for example, in U.S. Pat. Nos. 5,556,083, 4,884,790 and 5,020,783. Devices having multiple rods are disclosed, for example, in U.S. Pat. Nos. 6,877,728, 5,158,321, 6,752,411 and 5,163,701. Devices with elastic mountings are disclosed, for example, in U.S. Pat. Nos. 5,382,007 and 4,966,386. U.S. Pat. No. 5,326,128 shows a device which is adjustable only by disassembly and replacement of parts. U.S. Pat. No. 6,454,284 shows a device which is adjustable only in portions. U.S. Pat. No. 6,241,224 teaches a torsion spring made of an elastic compound between plastic end pieces. All of those devices suffer from the stresses described above.

SUMMARY OF THE INVENTION

It is accordingly an object of the invention to provide a non-helical torsion spring system, which overcomes the hereinafore-mentioned disadvantages of the heretofore-known devices of this general type and which eliminates stresses in non-helical torsion springs.

With the foregoing and other objects in view there is provided, in accordance with the invention, a non-helical torsion spring system, comprising an arm to be connected to a load and at least one ring to be connected to a moving member. At least two torsion elements each have one end disposed at and resisting rotation relative to the arm but permitting flexural movement relative to the arm. The at least two torsion elements each have another end disposed at and resisting rotation relative to the at least one ring but permitting flexural movement relative to the at least one ring. Either the torsion element end at the arm or the torsion element end at the ring, or both, are movable axially, that is lengthwise. A torsion control is provided for adjusting torsion in the at least two torsion elements. The provision of multiple torsion elements rather than a helical or coil spring used in the prior art, greatly reduces or eliminates stresses. When used in a vehicle, the load is a frame or chassis of the vehicle and the moving member is a vehicle suspension member.

The system according to the invention eliminates stresses by providing a non-helical, true torsion system having two or more separate, small diameter, multi-centric torsion elements controlled in one or more separate groupings in which each element torsions freely from all other elements. The elements are free lengthwise at one or both end attachments to allow the elements to shift lengthwise in either direction to shorten or lengthen as they spiral and un-spiral. The element end attachments are rotationally resistive while still retaining two axis freedom in both length and flexion movements.

In accordance with another feature of the invention, the at least one ring is a plurality of control rings, and the at least two torsion elements are disposed in groups, each group being associated with a respective one of the control rings. In a preferred embodiment, three concentric groups, that is inner, outer and middle groups, are provided.

In accordance with a further feature of the invention, the torsion control includes control rods. The at least one ring is a plurality of control rings each having a control arm being adjustable along a respective one of the control rods for adjusting torsion in the at least two torsion elements. In a preferred embodiment, the control rods are externally threaded, and the control arms have internally threaded posts screwed on the control rods. The control rods need merely be rotated for adjusting the torsion in the torsion elements.

In accordance with an added feature of the invention, there is provided a rod mount on which the control rods are pivotable and end mounts on which the arm and the at least two torsion elements are respectively mounted. The at least two torsion elements may be metal rods, but synthetic, non-metallic or composite materials may be used as well.

In accordance with an additional feature of the invention, the torsion control includes engagement pins each to be actuated for connecting and disconnecting a respective one of the at least two torsion elements to the at least one ring. This provides a simple measure for adjusting the torsion manually in the torsion elements with almost infinite variation in adjustment.

In accordance with yet another feature of the invention, the torsion control includes servomotors each to be activated for connecting and disconnecting a respective one of the at least two torsion elements to the at least one ring. These servomotors serve the same purpose as the engagement pins but can be activated more easily and quickly.

In accordance with yet a further feature of the invention, there are provided servomotors for rotating the control rods. Once again, such servomotors are quicker and easier to use than manual rotation of the control rods.

In accordance with yet an added feature of the invention, there is provided an electronic control individually or multiply activating the servomotors for connecting the at least two torsion elements to the at least one ring and individually or multiply activating the servomotors for rotating the control rods. It is therefore possible for an operator of the system, such as a driver of a vehicle using the system, to remotely set the servomotors based on an expected load. The individual settings of the servomotors can be determined empirically and stored in a table in the electronic control for ease of use with loads in the future.

In accordance with yet an additional feature of the invention, there is provided at least one sensor connected to the electronic control for automatically activating the electronic control. In this way, the servomotors are set according to the table without any human intervention. Of course, individual servomotors can still be activated if a change from the preset program according to the table is desired.

In accordance with again another feature of the invention, the at least two torsion elements have unequal lengths or unequal diameters. The elements may have unequal lengths and unequal attachment diameters to allow better access to the control end of each torsion element for more effective individual element engagement, gear or servo mountings for manual or dynamic engagement and control.

In accordance with a concomitant feature of the invention, the load is a building structure and the moving member is a door, such as a garage door, preferably an overhead garage door.

The system according to the invention is constructed without significant stress which allows a wide range of spring loads, greater range of rotation, greater arc of usable spring load, higher cycle life, absence of element deformation or failure, improved spring efficiency, infinitely adjustable spring resistance, preload, position control and suitability for non-metallic or composite construction for a broad range of general or vehicle uses. The elements operate in independent pure torsion where many molecules move a little and the torsion is shared evenly along each element.

The total spring load capability, spring rate, spring position, preload, and range of motion are adjustable and controlled within the spring system either manually or automatically and controlled not only by the total number of elements, their individual strength, length, preload and position of each grouping but also by the number of elements engaged manually, automatically or real time dynamically at any one instant.

Other features which are considered as characteristic for the invention are set forth in the appended claims.

Although the invention is illustrated and described herein as embodied in a non-helical torsion spring system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 15 is a perspective view, similar to FIG. 14, of the control end of the servomotor embodiment.

DESCRIPTION OF THE PREFERRED EMBODIMENTS

Figure 1:
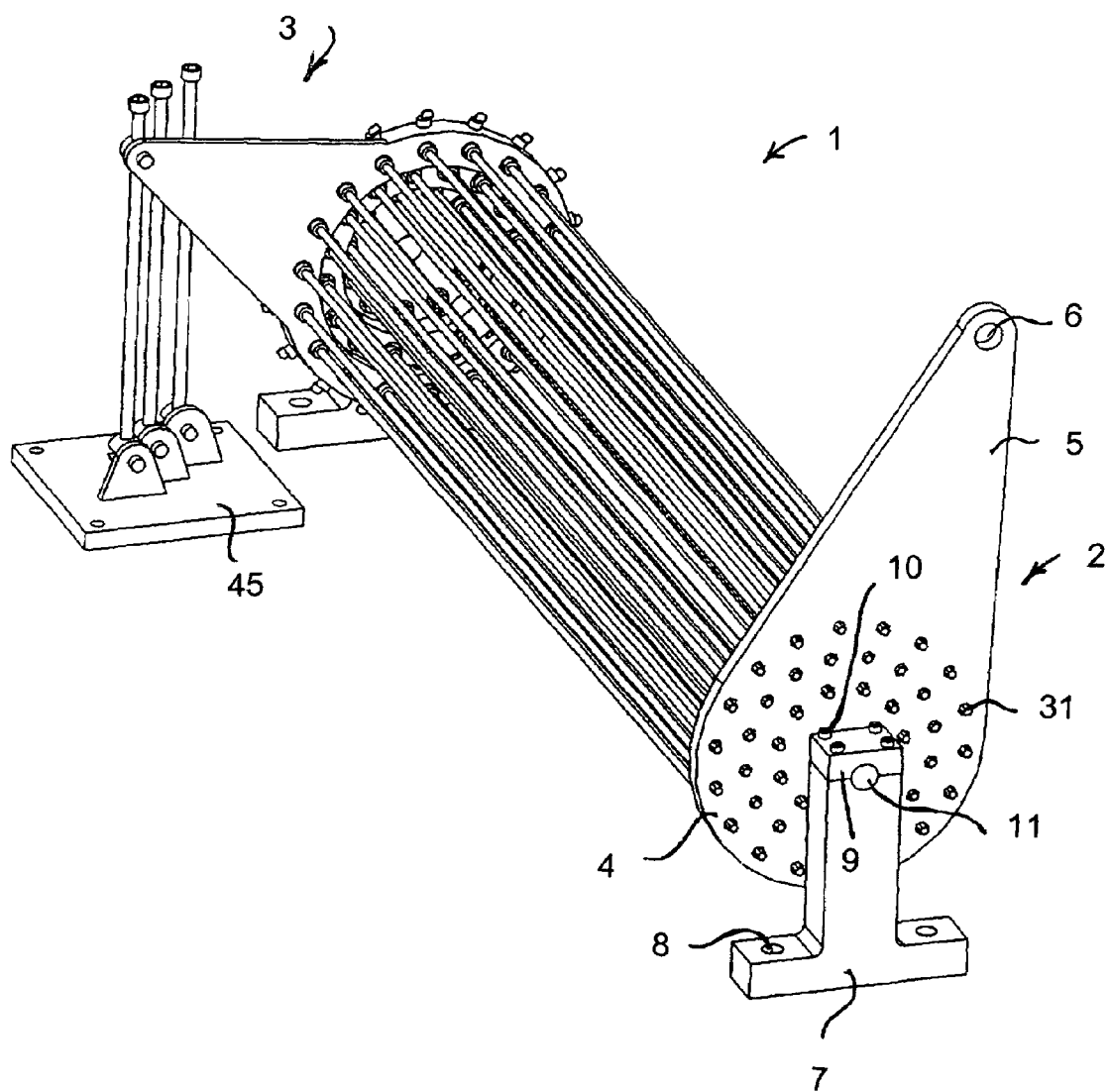
FIG. 1 is a diagrammatic, perspective view of a manual engagement embodiment of a torsion spring system according to the invention, as seen from a working end.

Referring now to the figures of the drawings in detail and first, particularly, to FIG. 1 thereof, there is seen a perspective view of a first, manual engagement embodiment of a torsion spring system 1 according to the invention, having a working or load end 2 and a control end 3. A working end ring 4, located at the working end 2, has a working arm 5 with an engagement opening 6 acting as a work or load attachment point, for instance for attachment to a vehicle chassis or frame. The working end ring 4 is mounted on a working end mount 7 having mounting holes 8, for instance for mounting on a moving member, such as a suspension member for a wheels of a vehicle. The mount 7 also has a cap 9 secured by bolts 10. A bearing opening 11 is formed by the mount 7 and the cap 9. The load could also be a building structure and the moving member a door, such as a garage door, preferably an overhead garage door.

Figure 2:
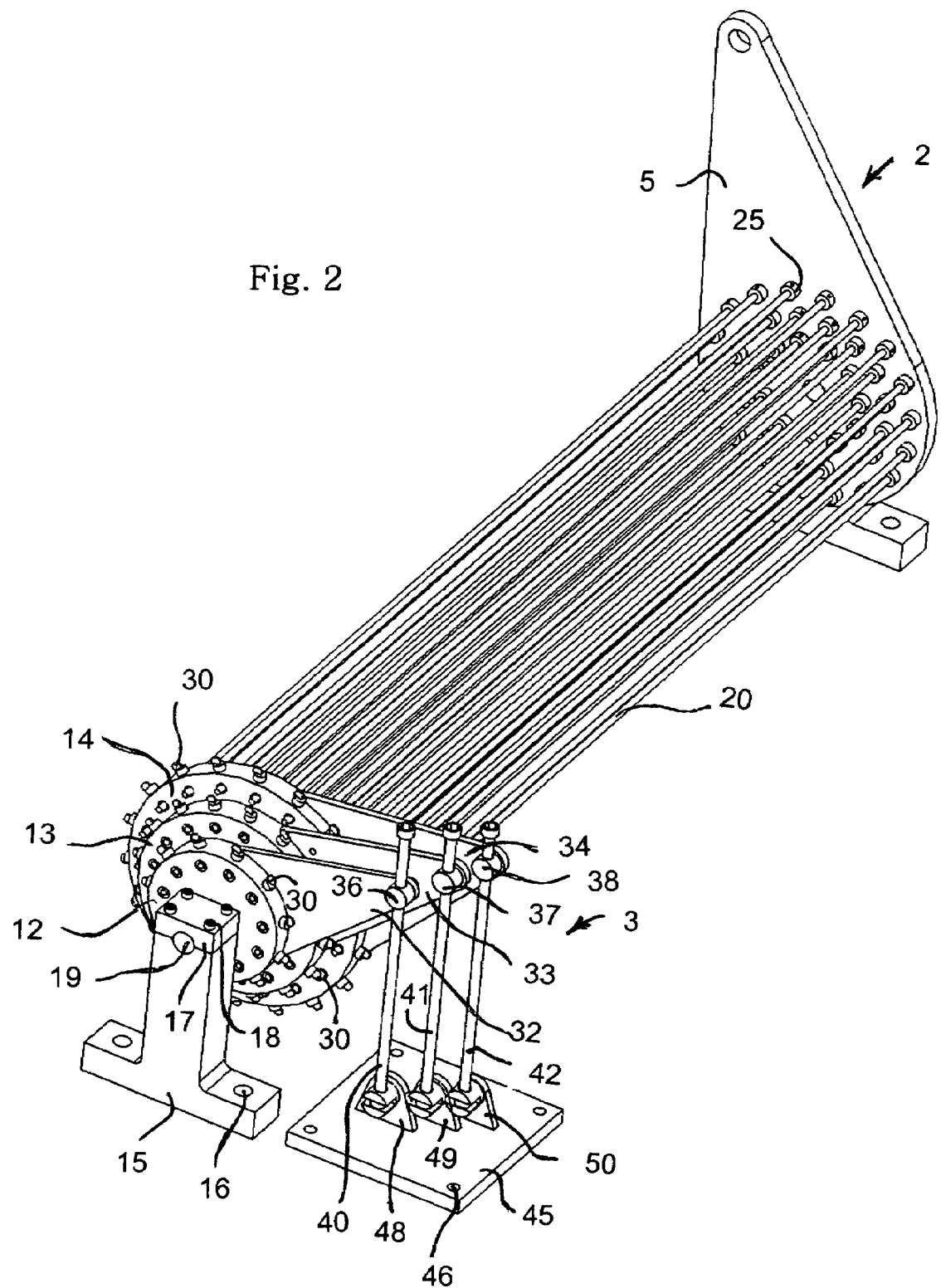
FIG. 2 is a perspective view of the manual engagement embodiment of the torsion spring system, as seen from a control end.

As is best seen in FIG. 2, three independent control rings 12, 13, 14 are located at the control end 3, although one, two or more than three may be used. The control rings 12-14 are mounted on a control end mount 15 having mounting holes 16 which may also be connected to the moving member or vehicle suspension member. A cap 17 is secured to the mount 15 by bolts 18, defining a bearing opening 19 between the mount 15 and the cap 17. A non-illustrated shaft passes through the bearing opening 11 in the working end mount 7 and the bearing opening 19 in the control end mount 15.

Figure 3:
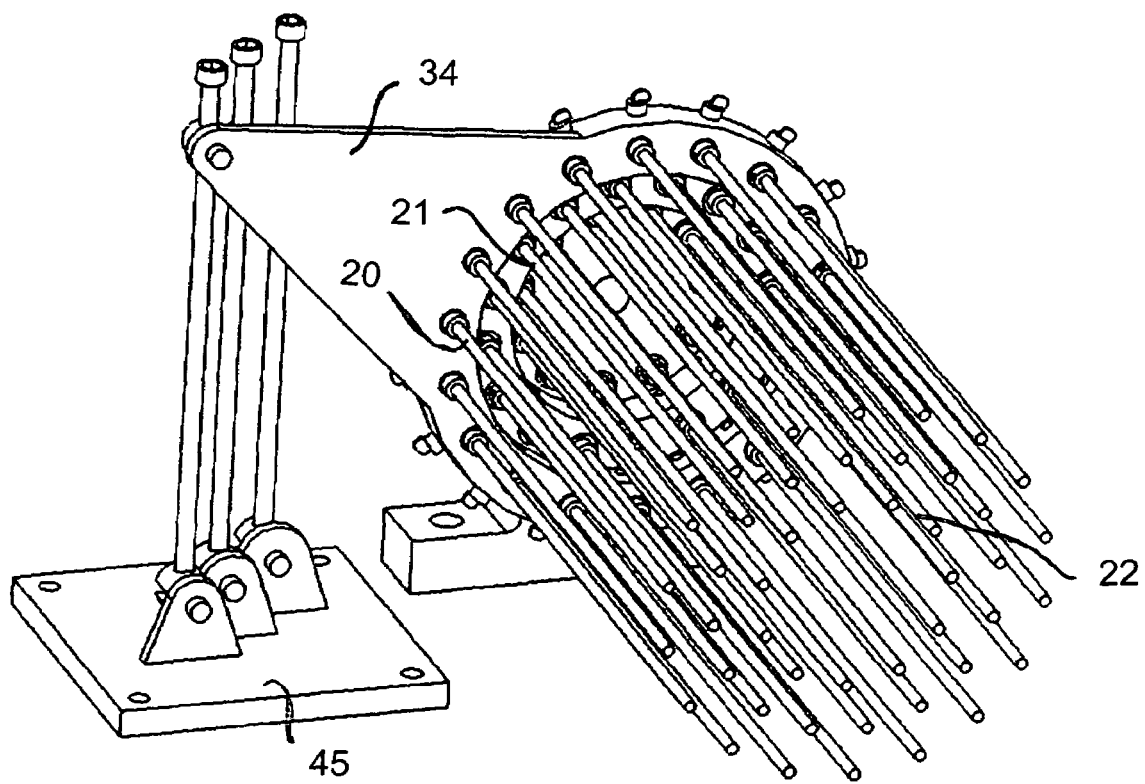
FIG. 3 is a fragmentary, perspective view of the control end of the manual engagement embodiment.
Figure 4:
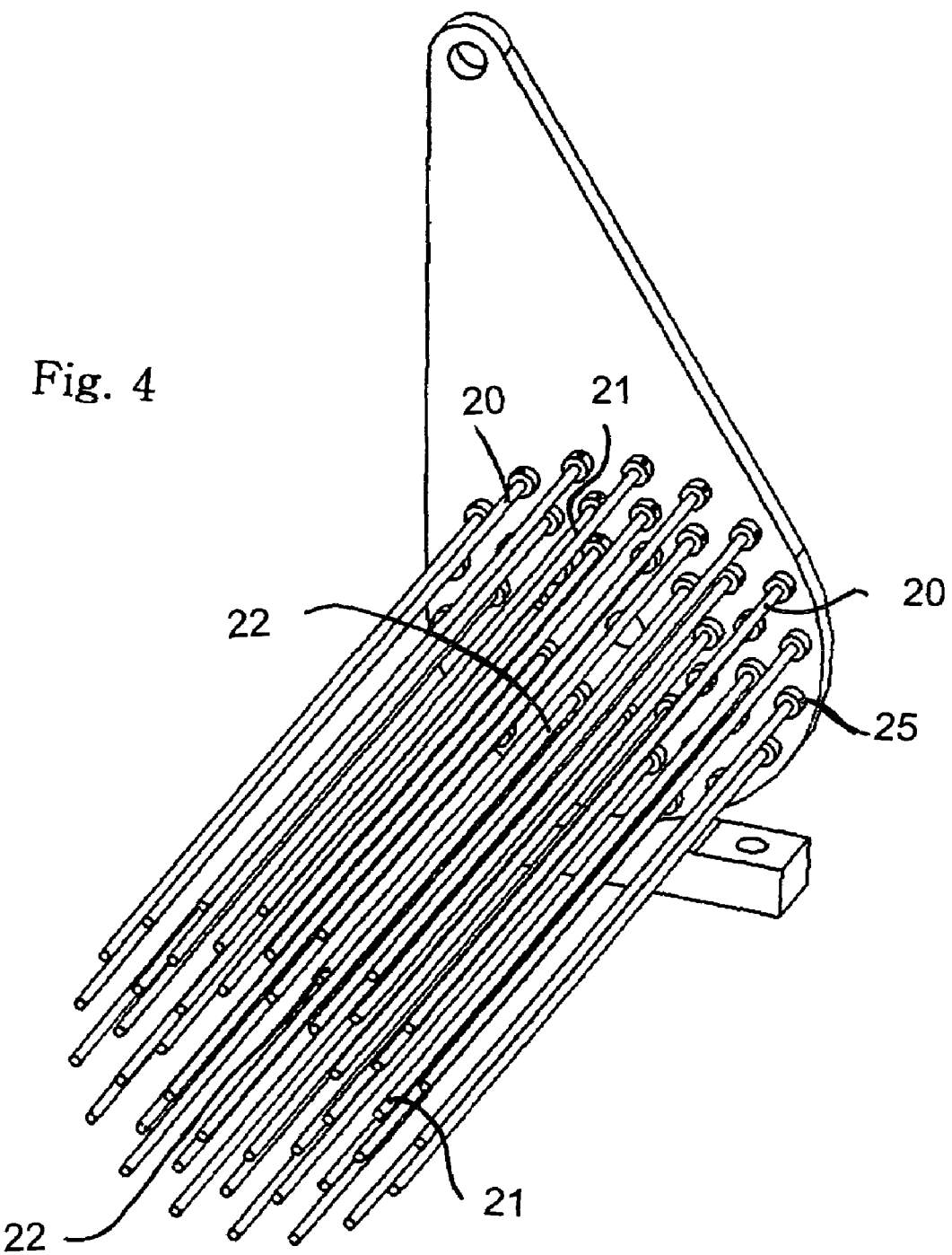
FIG. 4 is a fragmentary, perspective view of the working end of the manual engagement embodiment.
Figure 5:
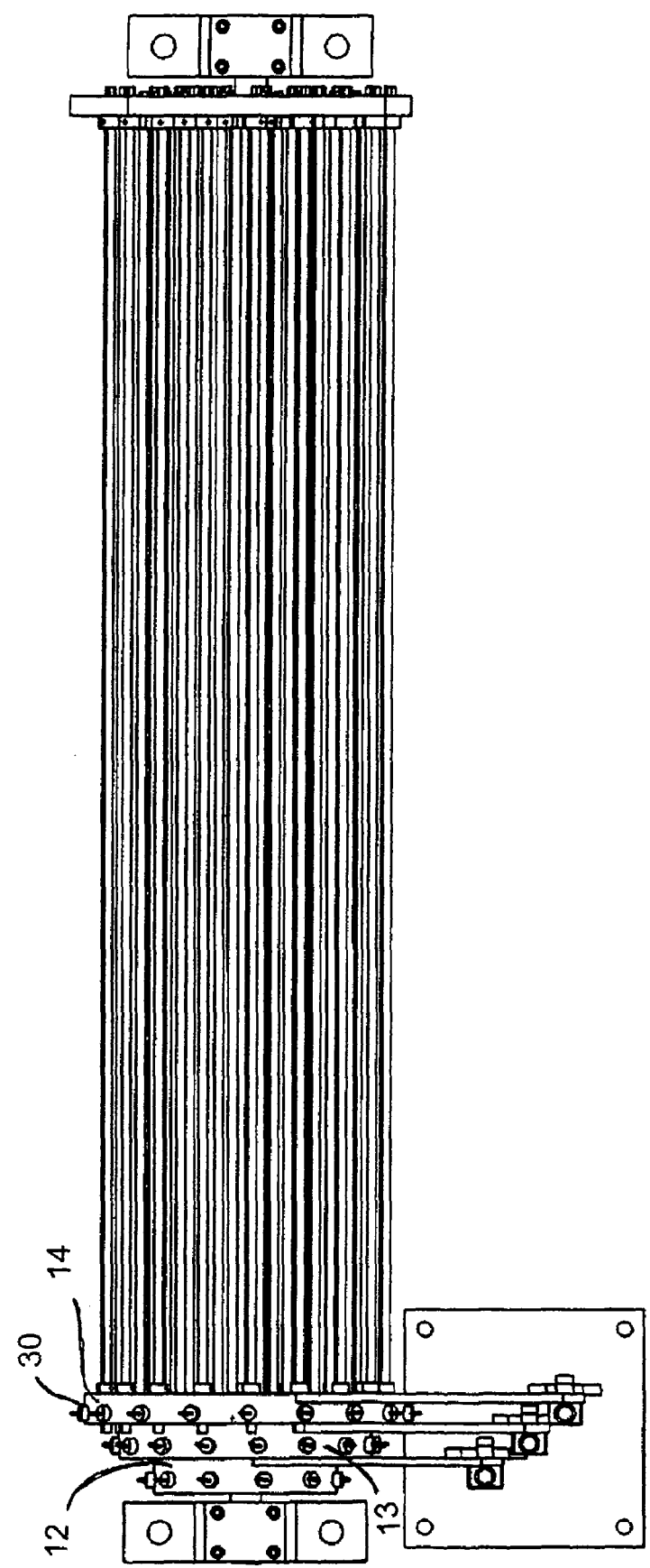
FIG. 5 is a front-elevational view of the manual engagement embodiment of the torsion spring system.
Figure 6:
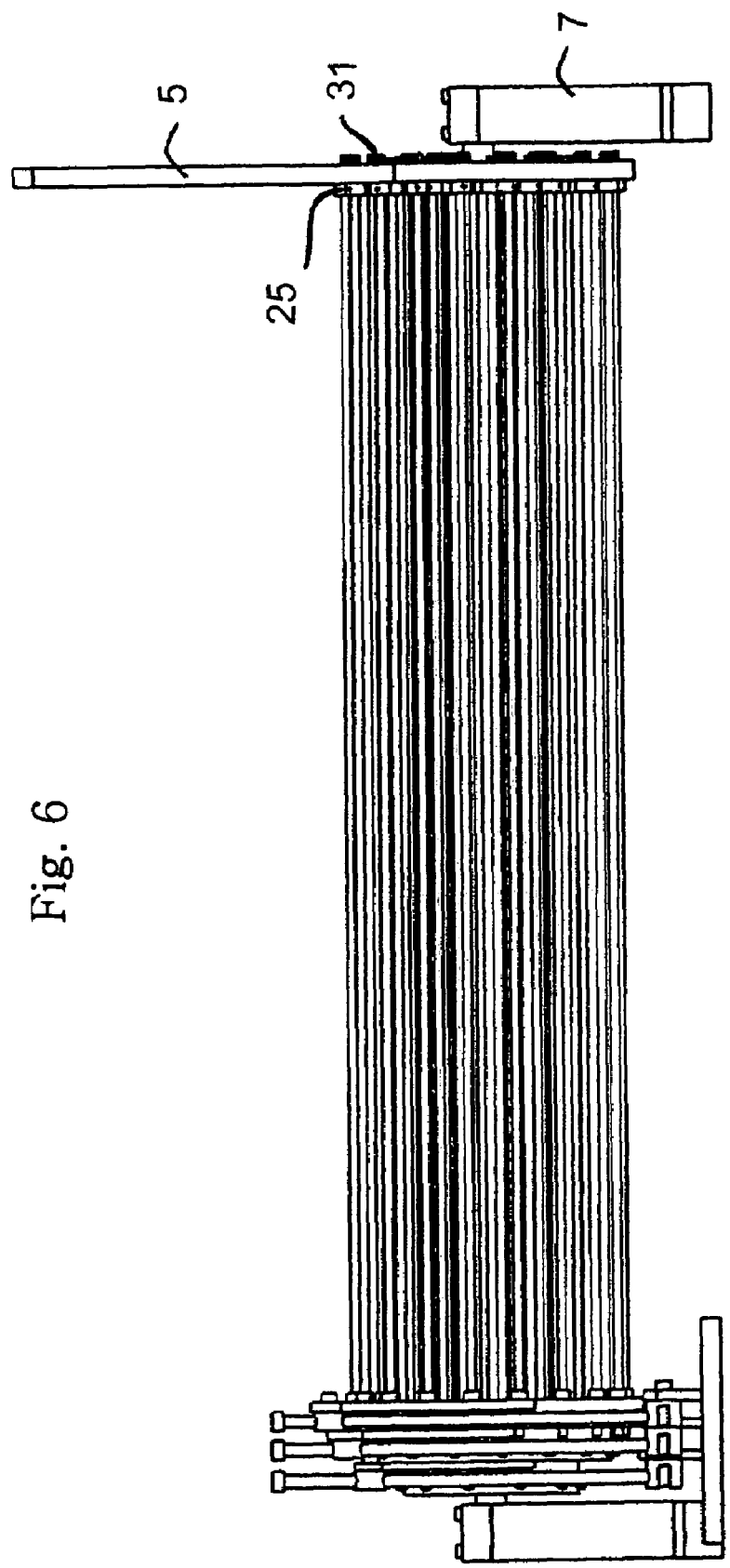
FIG. 6 is a side-elevational view of the manual engagement embodiment of the torsion spring system.
Figure 7:
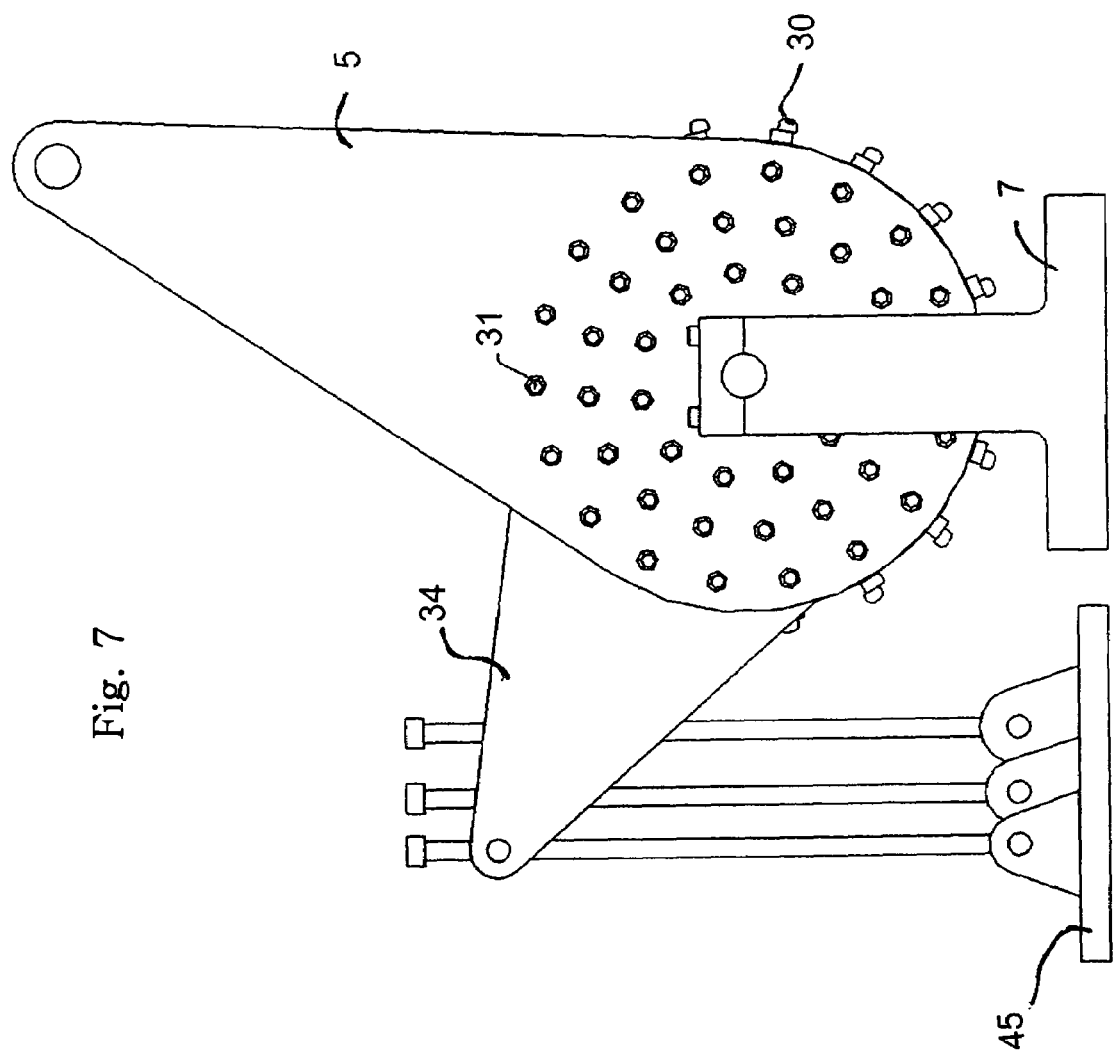
FIG. 7 is an end-elevational view as seen from the working end of the manual engagement embodiment.
Figure 8:
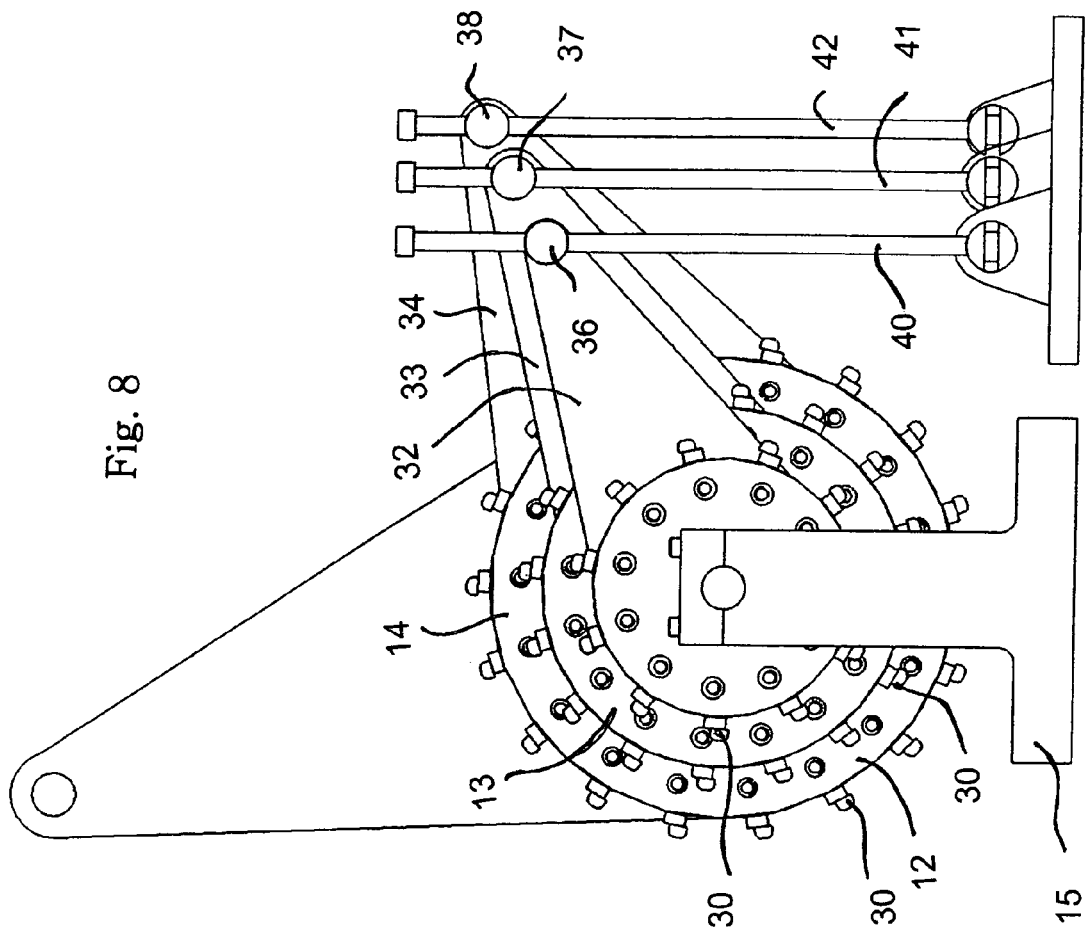
FIG. 8 is an end-elevational view as seen from the control end of the manual engagement embodiment.
Figure 9:
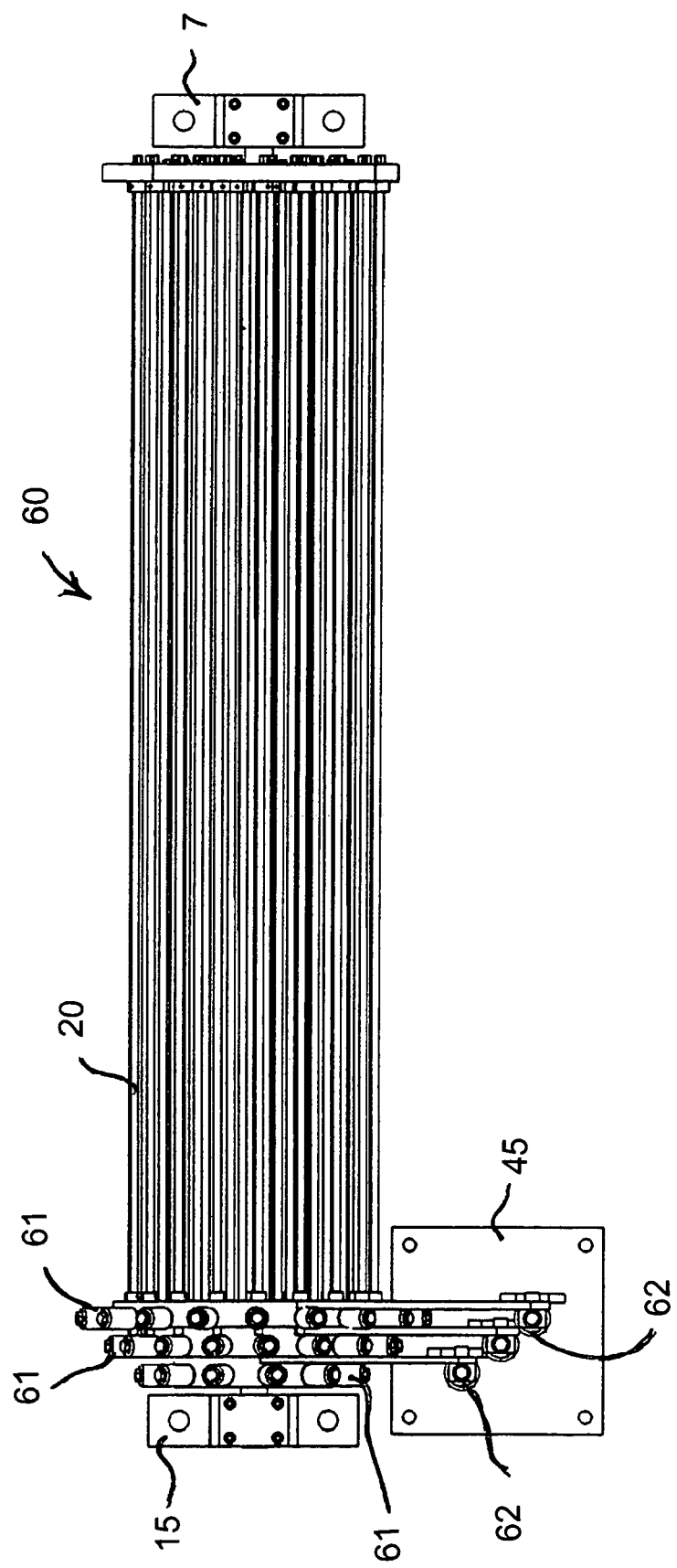
FIG. 9 is a front-elevational view of a servomotor engagement embodiment of the torsion spring system according to the invention.
Figure 10:
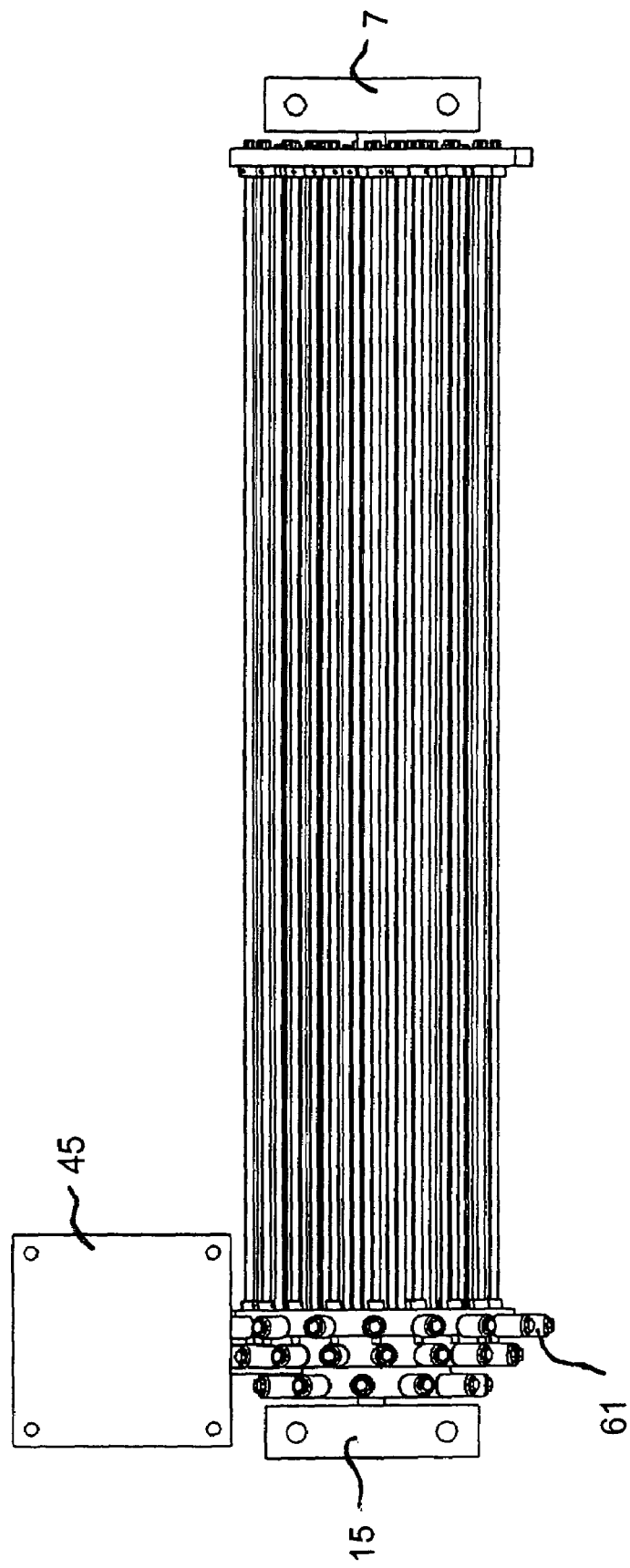
FIG. 10 is a rear-elevational view of the servomotor engagement embodiment of the torsion spring system.
Figure 11:
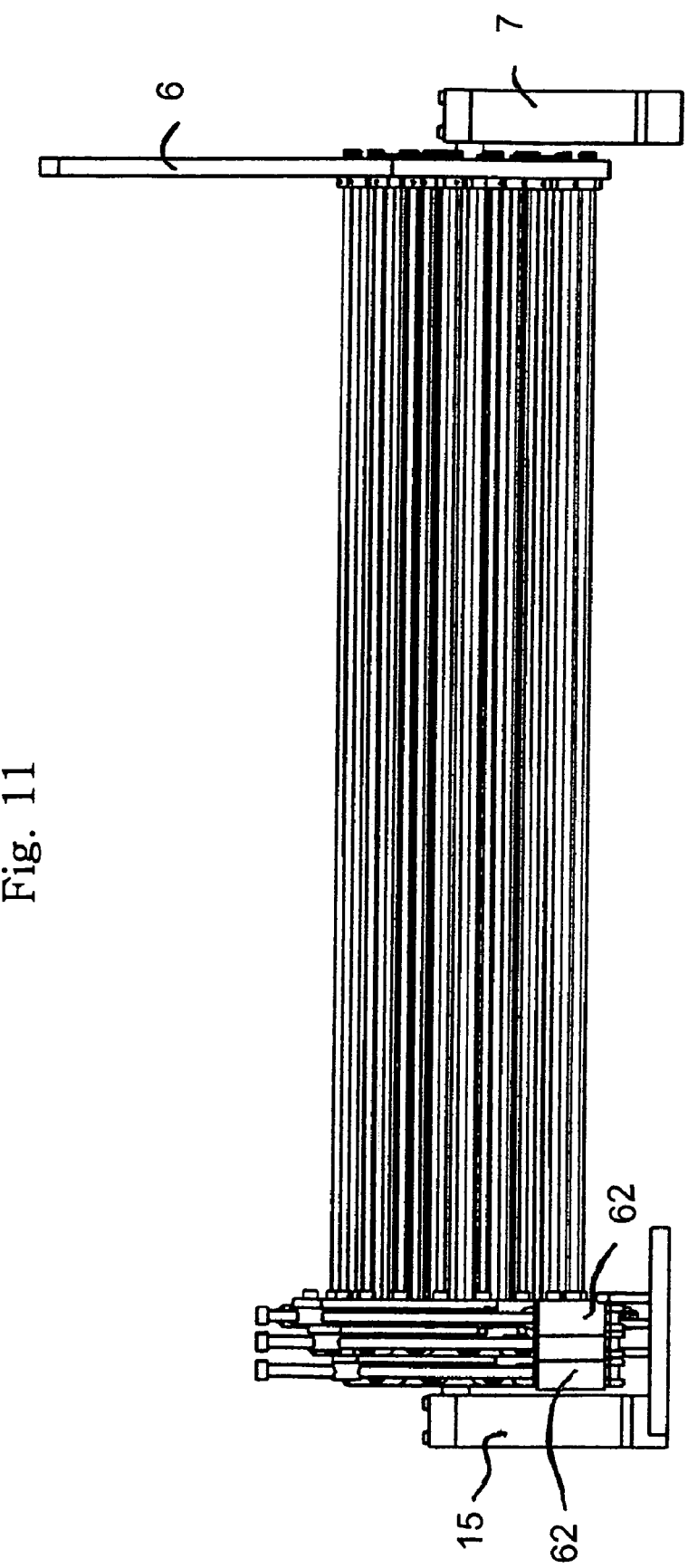
FIG. 11 is a side-elevational view the servomotor engagement embodiment of the torsion spring system.
Figure 12:
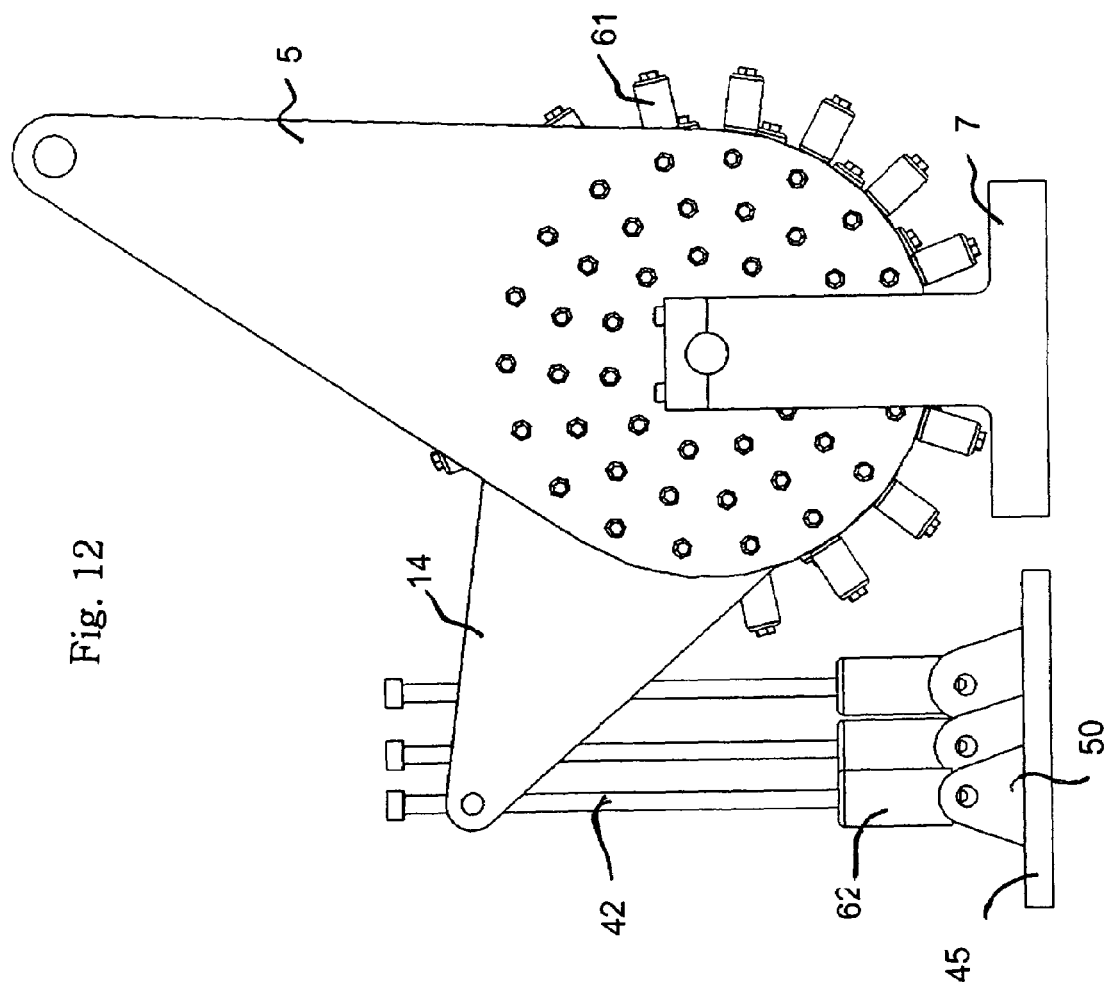
FIG. 12 is an end-elevational view as seen from the working end of the servomotor engagement embodiment.

Three groups of individual torsion elements 20, 21, 22 are each extended between the working end ring 4 and a respective one of the control rings 12-14. This best seen in FIGS. 3 and 4, wherein outer torsion elements 20, middle torsion elements 21 and inner torsion elements 22 are shown. Referring to FIGS. 1,2,4,6 and 7, it is seen that each torsion element 20,21, 22, has one end secured to the working end ring 4 by respective collars 25 and bolts 31 so as to resist relative rotation while permitting flexural movement and optionally permitting axial movement. FIGS. 2, 5 and 8 also show that the torsion elements 20, 21, 22 have another end secured to the respective control rings 12-14 by individually manually actuated engagement pins 30 each passing through a control ring to a torsion element so that the torsion element can resist rotation relative to the control ring while permitting flexural movement and optionally permitting axial movement.

As is seen in FIGS. 2 and 8, each control ring 12, 13, 14 has a respective control arm 32, 33, 34. Each of the control arms 32,33, 34 has a respective threaded post 36, 37, 38 into which a respective control rod 40, 41, 42 is screwed. The control rods 40, 41, 42 are connected to a rod mount 45 having mounting holes 46, at respective pivot posts 48, 49, 50. The rod mount 45 may be connected to the vehicle suspension member as well.

Elements 12-14, 25, 30, 31, 32-34, 36-38, 40-42 and 48-50 therefore provide a torsion control for adjusting torsion in the torsion elements 20-22. The torsion of the system 1 can be adjusted by individually engaging or disengaging each of the engagement pins 30 and by adjusting the position of the posts 36-38 and thus of the control arms 32-34 along the control rods 40-42. The torsion can therefore be matched, for example, to the weight, size and expected load bearing capacity of a vehicle. An infinite adjustment is made possible due to the these adjustments of the pins and the control arms and the location, composition and stiffness of the three groups of rods.

A second, servomotor engagement embodiment of a torsion spring system 60 according to the invention, is seen in FIGS. 9-15. Only the differences between the first and second embodiments will be described below.

FIGS. 9, 10 and 12-15 show engagement servomotors 61 which are used, instead of the engagement pins 30 of the first embodiment, for engagement between the individual torsion elements 20, 21, 22 and the control rings 12, 13,14. FIGS. 9 and 13-15 also show control servomotors 62 for rotating the externally threaded control rods 40-42 within the posts 36-38.

Figure 13:
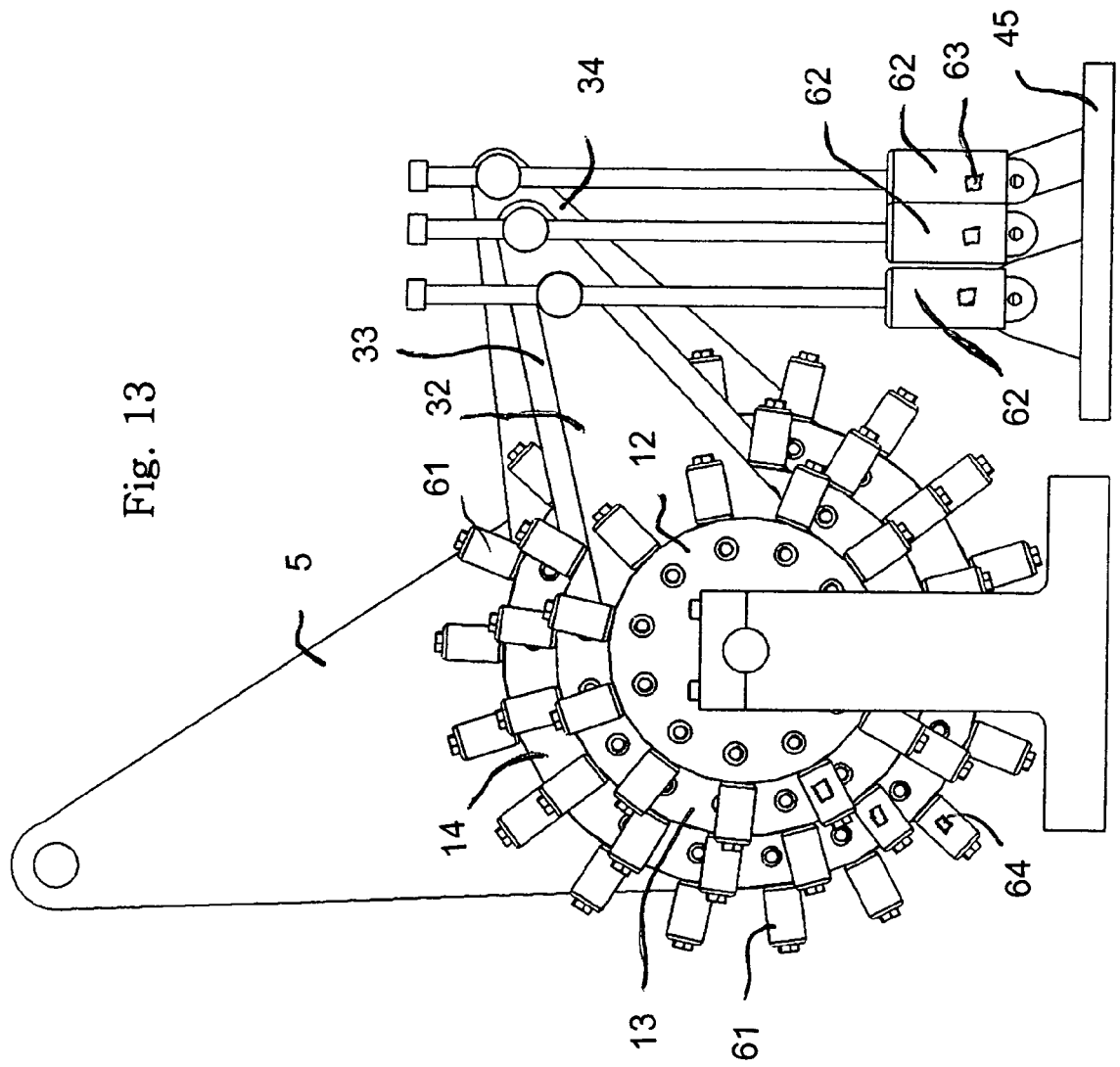
FIG. 13 is an end-elevational view as seen from the control end of the servomotor engagement embodiment.
Figure 14:
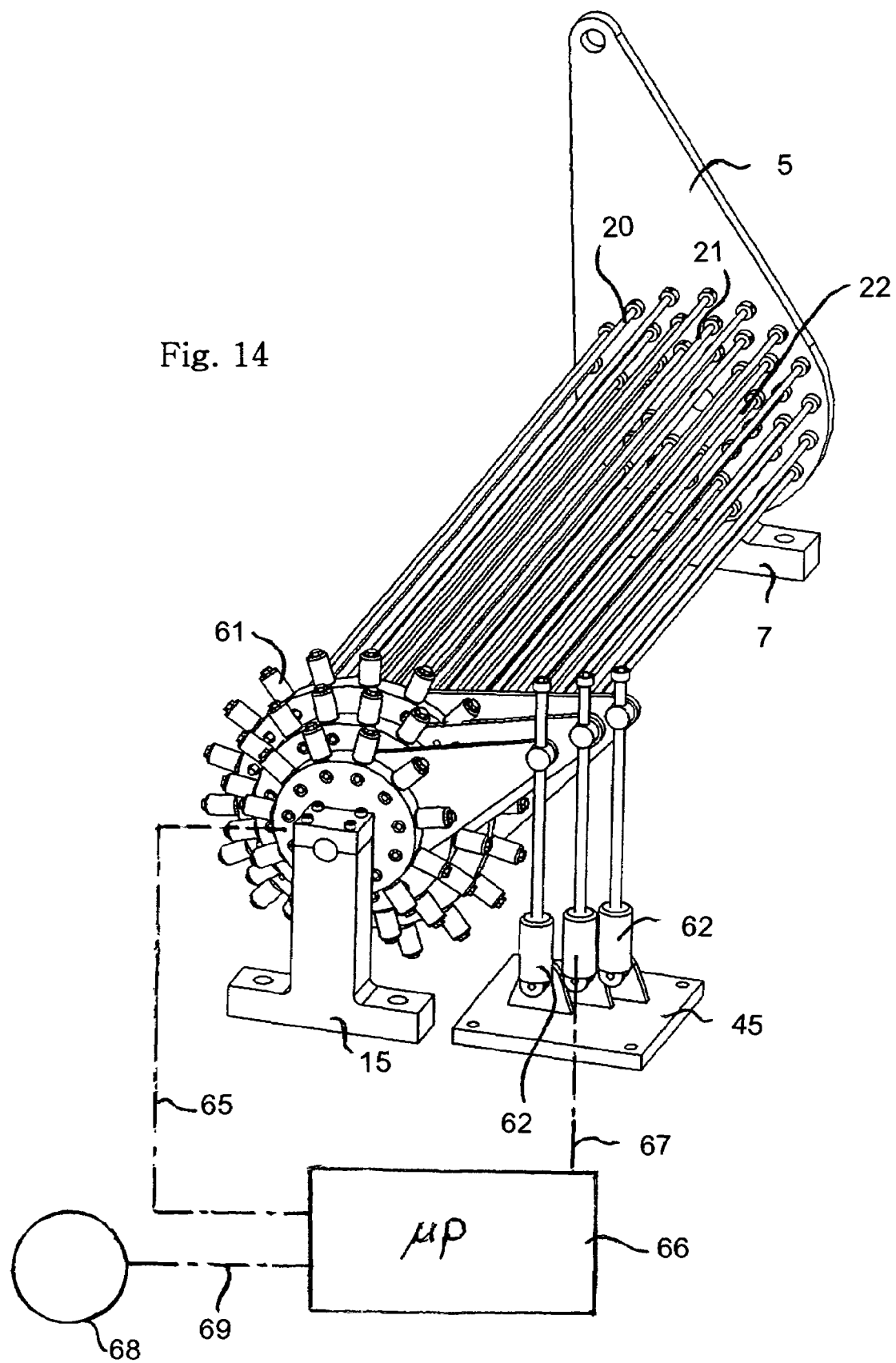
FIG. 14 is a perspective view of the servomotor embodiment of the torsion spring system, as seen from the control end.

The servomotors 61, 62 may be controlled by manually activating switches 63, 64, only a few of which are illustrated in FIG. 13, for controlling one or a group of servomotors. The switches may be located near or on the servomotors as shown or they may be remote therefrom. Remote control of the servomotors 61 can be effected by non-illustrated brushes on the servomotors 61 contacting slip rings on the control rings 12-14 and cables 65 connected between the slip rings and an electronic control 66 shown in FIG. 14, such as in a panel on the dashboard of a vehicle. Similarly, cables 67 are connected between the servomotors 62 and the control panel 66. Remote control can also be effected wirelessly. In any event, the servomotors may be controlled individually or in groups and a control program in a microprocessor µP in the electronic control 66 may be used to control the servomotors based on an expected change in vehicle loading. Sensors 68 may also communicate over cables 69 with the microprocessor µP so as to activate one or more of the servomotors based on a change in load detected by the sensors 68. The sensors 68 may be placed in various locations throughout a vehicle or other load so that the torsion control may automatically adjust the torsion in different locations for uneven loads. Elements 61-69 are therefore part of the torsion control for adjusting torsion in the torsion elements 21-23.

I claim:

1. A non-helical torsion spring system, comprising:
an arm to be connected to a load;
at least one ring to be connected to a moving member;
at least two torsion elements each having one end disposed at and resisting rotation relative to said arm but permitting flexural movement relative to said arm, and another end disposed at and resisting rotation relative to said at least one ring but permitting flexural movement relative to said at least one ring, at least one of said ends being axially movable, said at least two torsion elements configured to be individually connected to and disconnected from said at least one ring; and
a torsion control for adjusting torsion in said at least two torsion elements, said torsion control including at least one control rod for positionally adjusting said at least one ring over a range along said at least one control rod.

2. The torsion spring system according to claim 1, which further comprises end mounts on which said arm and said at least two torsion elements are respectively mounted.

3. The torsion spring system according to claim 1, wherein said at least two torsion elements are round metal rods.

4. The torsion spring system according to claim 1, wherein said torsion control includes engagement pins each to be actuated for connecting and disconnecting a respective one of said at least two torsion elements to said at least one ring.

5. The torsion spring system according to claim 4, wherein said engagement pins and said at least one control rod infinitely adjust said at least two torsion elements.

6. The torsion spring system according to claim 1, wherein said torsion control includes servomotors each to be activated for connecting and disconnecting a respective one of said at least two torsion elements to said at least one ring.

7. The torsion spring system according to claim 1, wherein the load is a frame or chassis of a vehicle and the moving member is a vehicle suspension member.

8. The torsion spring system according to claim 1, wherein said at least two torsion elements have unequal lengths.

9. The torsion spring system according to claim 1, wherein said at least two torsion elements have unequal diameters.

10. The torsion spring system according to claim 1, wherein the load is a building structure and the moving member is a door.

11. The torsion spring system according to claim 1, wherein said at least one control rod adjusts torsion in said at least two torsion elements.

12. The torsion spring system according to claim 1, wherein said arm is to be connected directly to the load.

13. A non-helical torsion spring system, comprising:
an arm to be connected to a load;
a plurality of control rings to be connected to a moving member;
at least two torsion elements disposed in groups, each group being associated with a respective one of said control rings, said groups of torsion elements including inner and outer concentric groups, said at least two torsion elements each having one end disposed at and resisting rotation relative to said arm but permitting flexural movement relative to said arm, and another end disposed at and resisting rotation relative to said plurality of control rings but permitting flexural movement relative to said plurality of control rings, at least one of said ends being axially movable; and
a torsion control for adjusting torsion in said at least two torsion elements.

14. A non-helical torsion spring system, comprising:
an arm to be connected to a load;
a plurality of control rings to be connected to a moving member;
at least two torsion elements each having one end disposed at and resisting rotation relative to said arm but permitting flexural movement relative to said arm, and another end disposed at and resisting rotation relative to said plurality of control rings but permitting flexural movement relative to said plurality of control rings, at least one of said ends being axially movable; and
a torsion control for adjusting torsion in said at least two torsion elements, said torsion control including control rods;
said plurality of control rings each having a control arm being adjustable along a respective one of said control rods for adjusting torsion in said at least two torsion elements.

15. The torsion spring system according to claim 14, wherein said control rods are externally threaded, and said control arms have internally threaded posts screwed on said control rods.

16. The torsion spring system according to claim 15, which further comprises servomotors for rotating said control rods.

17. The torsion spring system according to claim 16, wherein said torsion control includes servomotors each to be activated for connecting and disconnecting a respective one of said at least two torsion elements to said plurality of control rings, and an electronic control individually or multiply activates said servomotors for connecting said at least two torsion elements to said plurality of control rings and individually or multiply activates said servomotors for rotating said control rods.

18. The torsion spring system according to claim 17, which further comprises at least one sensor connected to said electronic control for automatically activating said electronic control.

19. The torsion spring system according to claim 14, which further comprises a rod mount on which said control rods are pivotable.

* * * * *